United States Patent [19]

Kennedy et al.

[11] Patent Number: 4,882,306
[45] Date of Patent: Nov. 21, 1989

[54] METHOD FOR PRODUCING SELF-SUPPORTING CERAMIC BODIES WITH GRADED PROPERTIES

[75] Inventors: Christopher R. Kennedy; Andrew W. Urquhart, both of Newark; Danny R. White, New Castle; Marc S. Newkirk, Newark, all of Del.

[73] Assignee: Lanxide Technology Company, LP, Newark, Del.

[21] Appl. No.: 907,928

[22] Filed: Sep. 16, 1988

[51] Int. Cl.⁴ ............................................ C04B 35/02
[52] U.S. Cl. .................................... 501/87; 501/88; 501/94; 501/96; 501/98; 501/127; 501/128; 501/134; 501/153; 264/65; 264/66
[58] Field of Search .................. 501/87, 88, 94, 96, 501/98, 127, 128, 134, 153; 423/345, 411, 412, 618, 625, 111, 132; 75/235; 264/65, 66, 233, 344

[56] References Cited

U.S. PATENT DOCUMENTS

| | | |
|---|---|---|
| 2,741,822 | 4/1956 | Udy . |
| 3,255,027 | 6/1966 | Talsma . |
| 3,296,002 | 1/1967 | Hare . |
| 3,298,842 | 1/1967 | Seufert . |
| 3,419,404 | 12/1968 | Mao ...................................... 106/65 |
| 3,421,863 | 1/1969 | Bawa . |
| 3,437,468 | 4/1969 | Seufert ................................ 51/298 |
| 3,473,938 | 10/1969 | Oberlin . |
| 3,473,987 | 10/1969 | Sowards . |
| 3,538,231 | 11/1970 | Newkirk et al. . |
| 3,770,488 | 11/1973 | Pepper et al. . |
| 3,789,096 | 1/1974 | Church . |
| 3,864,154 | 2/1975 | Gazza et al. . |
| 3,973,977 | 8/1976 | Wilson . |

FOREIGN PATENT DOCUMENTS

| | | |
|---|---|---|
| 0116809 | 8/1984 | European Pat. Off. . |
| 0155831 | 9/1985 | European Pat. Off. . |
| 0169067 | 1/1986 | European Pat. Off. . |
| 654 | 7/1985 | Greece . |

OTHER PUBLICATIONS

"Oxidation of Molten Aluminum Alloys. Reaction with Refractories"-M. Drouzy and M. Richard-Mar. 1974-Fonderie, France No. 332, pp. 121-128.
"Refractories for Aluminum Alloy Melting Furnaces'-'-B. Clavaud and V. Jost-Sep. 1980-Lillian Brassinga (from French), Jan. 1985.

Primary Examiner—William R. Dixon, Jr.
Assistant Examiner—Andrew Griffis
Attorney, Agent, or Firm—Mark G. Mortenson; Michael K. Boyer

[57] ABSTRACT

A method is provided for producing a self-supporting ceramic or ceramic composite body by oxidation of a parent metal, the self-supporting body having a graded microstructure characterized by a plurality of zones differing from each other in one or more properties. The zones in the body are attained by altering the process conditions during formation of the body such that a zone of the oxidation reaction product formed posterior to said altering has at least one property different from a zone of the oxidation reaction product formed anterior to said altering.

14 Claims, 1 Drawing Sheet

METHOD FOR PRODUCING SELF-SUPPORTING CERAMIC BODIES WITH GRADED PROPERTIES

BACKGROUND

This invention relates to a method for producing a self-supporting ceramic or ceramic composite body having a plurality of zones which differ from each other in at least one property. The self-supporting body is produced by the oxidation of a molten parent metal with an oxidant. This invention also relates to novel articles produced by the disclosed method.

In recent years there has been an increasing interest in substituting ceramics for metals because, with respect to certain properties, ceramics are superior to metals. There are, however, several known limitations or difficulties in making this substitution such as scaling versatility, capability to produce complex shapes, satisfying the properties required fo the end-use application, and costs. Many of these limitations or difficulties have been overcome by the inventions disclosed in patent applications assigned to the same assignee as this application and discussed in the subsequent section, which provide novel methods for reliably producing ceramic materials, including shaped composites.

DESCRIPTION OF COMMONLY OWNED PATENT APPLICATIONS

The following commonly owned patent applications describe novel methods for producing a self-supporting ceramic body by oxidation of a parent metal to form a polycrystalline material comprising an oxidation reaction product and, optionally, metallic constituents:

(A) U.S. patent application Ser. No. 818,943, filed Jan. 15, 1986, now U.S. Pat. No. 4,713,360 which is a continuation-in-part of U.S. patent application Ser. No. 776,964, filed Sept. 17, 1985, which is a continuation-in-part of U.S. patent application Ser. No. 705,787 filed Feb. 26, 1985, which is a continuation-in-part of U.S. patent application Ser. No. 591,392 filed Mar. 16, 1984, all in the names of Marc S. Newkirk et al and entitled "Novel Ceramic Materials and Methods for Making the Same";

(B) U.S. patent application Ser. No. 822,999, filed Jan. 27, 1986, and now allowed which is a continuation-in-part of U.S. patent application Ser. No. 776,965, filed Sept. 17, 1985, which is a continuation-in-part of U.S. patent application Ser. No. 747,788, filed June 25, 1985, which is a continuation-in-part of U.S. patent application Ser. No. 632,636, filed July 20, 1984, all in the names of Marc S. Newkirk et al and entitled "Methods of Making Self-Supporting Ceramic Materials";

(C) U.S. patent application Ser. No. 819,397, filed Jan. 17, 1986, which is a continuation-in-part of Ser. No. 697,876, filed Feb. 4, 1985, both in the names of Marc S. Newkirk et al and entitled "composite Ceramic Articles and Methods of Making Same"; and (D) U.S. patent application Ser. No. 168,798, filed Mar. 16, 1988, which is a continuation-in-part of U.S. patent application Ser. No. 908,453, filed Sept. 17, 1986, in the names of Robert L. Kantner, et al., and entitled "Method for Producing Self-Supporting Ceramic Bodies with Refined Microstructures."

The entire disclosures of each of the aforesaid Commonly Owned Patent Applications are incorporated herein by reference.

As explained in these Commonly Owned Patent Applications, novel polycrystalline ceramic materials or polycrystalline ceramic composite materials are produced by the oxidation reaction between a parent metal and a vapor-phase oxidant, i.e. a vaporized or normally gaseous material, as an oxidizing atmosphere. The method is disclosed generically in the aforesaid Commonly Owned Patent Applications "A". In accordance with this generic process, a parent metal, e.g. aluminum, is heated to an elevated temperature above its melting point but below the melting point of the oxidation reaction product to form a body of molten parent metal which reacts upon contact with a vapor-phase oxidant to form the oxidation reaction product. At this temperature, the oxidation reaction product, or at least a portion thereof, is in contact with and extends between the body of molten parent metal and the oxidant, and molten metal is drawn or transported through the formed oxidation reaction product and towards the oxidant. The transported molten metal forms additional oxidation reaction product upon contact with the oxidant, at the surface of previously formed oxidation reaction product. As the process continues, additional metal is transported through this formation of polycrystalline oxidation reaction product thereby continually "growing" a ceramic structure of interconnected crystallites. The resulting ceramic body may contain metallic constituents, such as, for example, non-oxidized constituents of the parent metal, and/or voids. In the case of an oxide as the oxidation reaction product, oxygen or gas mixtures containing oxygen (including air) are suitable oxidants, with air usually being preferred for obvious reasons of economy. However, oxidation is used in its broad sense in all of the Commonly Owned Patent Applications and in this application, and refers to the loss or sharing of electrons by a metal to an oxidant which may be one or more elements and/or compounds. Accordingly, elements other than oxygen, or compounds, may serve as the oxidant, as explained below in greater detail.

In certain cases, the parent metal may require the presence of one or more dopants in order to favorably influence or facilitate growth of the oxidation reaction product, and the dopants are provided as alloying constituents of the parent metal. For example, in the case of aluminum as the parent metal and air as the oxidant, dopants such as magnesium and silicon, to name but two of a larger class of dopant materials, are alloyed with aluminum and utilized as the parent metal. The resulting oxidation reaction product comprises alumina, typically alpha-alumina.

The aforesaid Commonly Owned Patent Applications "B" disclose a further development based on the discovery that appropriate growth conditions as described above, for parent metals requiring dopants, can be induced by applying one or more dopant materials to the surface or surfaces of the parent metal, thus avoiding the necessity of alloying the parent metal with dopant materials, e.g. metals such as magnesium, zinc and silicon, in the case where aluminum is the parent metal and air is the oxidant. With this improvement, it is feasible to use commercially available metals and alloys which otherwise would not contain or have appropriately doped compositions. This discovery is advantageous also in that ceramic growth can be achieved in one or more selected areas of the parent metal's surface rather than indiscriminately, thereby making the process more efficiently applied, for example, by doping only one surface, or only portion(s) of a surface, of a parent metal.

Novel ceramic composite structures and methods of making them are disclosed and claimed in the aforesaid Commonly Owned Patent Application "C" which utilize the oxidation reaction to produce ceramic composite structures comprising a substantially inert filler infiltrated by the polycrystalline ceramic matrix. A parent metal positioned adjacent to a mass of permeable filler is heated to form a body of molten parent metal which is reacted with a vapor-phase oxidant, as described above, to form an oxidation reaction product. As the oxidation reaction product grows and infiltrates and adjacent filler material, molten parent metal is drawn through previously formed oxidation reaction product into the mass of filler and reacts with the oxidant to form additional oxidation reaction product at the surface of the previously formed product, as described above. The resulting growth of oxidation reaction product infiltrates or embeds the filler and results in the formation of a ceramic composite structure of a polycrystalline ceramic matrix embedding the filler.

As disclosed in Commonly Owned Patent Application "D", a process modifier can be employed in conjunction with a parent metal in order to refine the microstructure of the resulting product in comparison with the product of an unmodified process. This refinement can effect improved properties such as fracture toughness.

The aforesaid Commonly Owned Patent Applications describe the production of oxidation reaction products readily "grown" to desired thicknesses heretofore believed to be difficult, if not impossible, to achieve with conventional ceramic processing techniques. The present invention provides as a further improvement a method for "growing" ceramic or ceramic composite bodies comprising a plurality of zones in intimate juxtaposition, which differ from each other in one or more properties such as composition or measurable performance, thus alleviating the need for post-processing to accomplish a cohesive heterogeneous ceramic or ceramic composite body.

SUMMARY OF THE INVENTION

The present invention provides a methiod for producing a self-supporting ceramic or ceramic composite structure, hereinafter referred to generally as a ceramic structure or a ceramic body, comprising a plurality of zones differing from each other in one or more properties, which zones each comprise the oxidation reaction product of a molten parent metal and a vapor-phase oxidant and, optionally, non-oxidized metallic constituents. One or more process conditions are altered during formation of the ceramic structure such that the zone of oxidation reaction product formed posterior to altering the process condition(s) differs in one or more properties from at least one zone of oxidation reaction product formed anterior to said altering. The resulting product comprises a cohesive ceramic structure having a plurlity of zones, each differing in properties. Generally, in accordance with the present invention, a parent metal is heated in the presence of a vapor-phase oxidant to a temperature above its melting point, but below the melting point of the oxidation reaction product to form a body of molten metal. At that temperature, or within that temperature range, the molten parent metal is reacted with the vapor-phase oxidant to form an oxidation reaction product, which product is maintained at least partially in contact with and extends between the body of molten metal and vapor-phase oxidant. At that temperature, molten metal is continually transported into and through the previously formed oxidation reaction product, and into contact with the vapor-phase oxidant at the interface between previously formed oxidation reaction product and vapor-phase oxidant, thereby forming a progressively thicker layer of oxidation reaction product. It has been discovered that by altering one or more of the process conditions during this progressive process, the oxidation reaction product formed posterior to that altering can differ in one or more properties from the oxidation reaction product formed prior to or anterior to the altering. Moreover, although the altering of process conditions produces a discontinuity in one or more properties of the oxidation reaction product, the structure of the ceramic remains cohesive. The resulting ceramic structure comprises one or more oxidation reaction products and, optionally, non-oxidized metallic constituents.

Altering of one or more process conditions may include (1) providing a second vapor-phase oxidant and replacing the original vapor-phase oxidant with the second vapor-phase oxidant, (2) providing a process modifier and conjoining it with the transported molten parent metal, or (3) increasing or decreasing the reaction temperature, or combinations of either (1), (2), or (3). The resulting ceramic structure is recovered having at least two zones of oxidation reaction product which differ from each other in one or more properties, and several result from the respective oxidation reaction processes occurring anterior and posterior to the particular altering. In accordance with the present invention, the plurality of zones of oxidation reaction product may differ from one another in composition or measurable performance.

DETAILED DESCRIPTION OF THE INVENTION AND PREFERRED EMBODIMENTS

Figure 1:
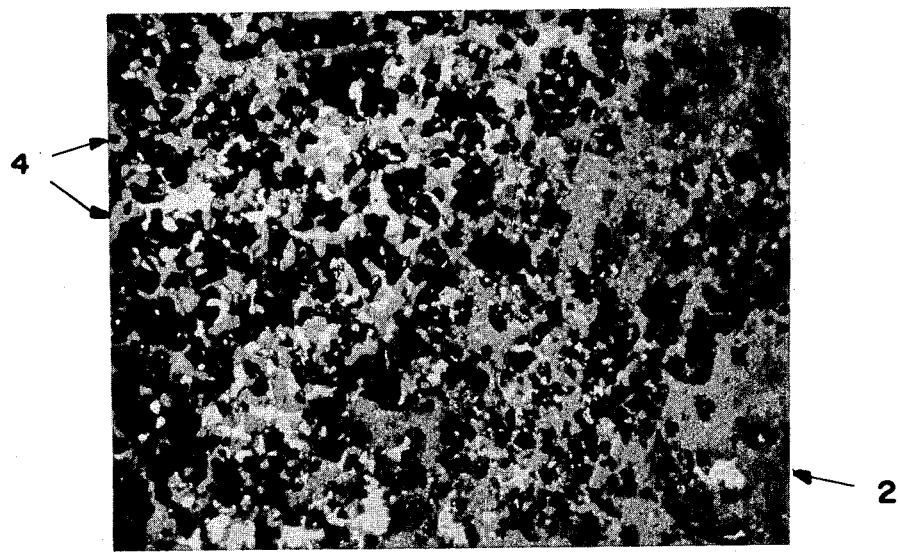
FIG. 1 is a photomicrograph of a section of a product formed according to the Example.

In accordance with the present invention, the parent metal, which may be doped (as explained below in greater detail), and is the precursor to the oxidation reaction product, is formed into an ingot, billet, rod, plate, or the like; and is placed into a setup of an inert bed, crucible or other refractory container.

This setup is heated in the presence of a vapor-phase oxidant to a temperature above the melting point of the parent metal, but below the melting point of the oxidation reaction product to form a body of molten parent metal. At that temperature, the molten parent metal is reacted with the vapor-phase oxidant to form a layer of oxidation reaction product. However, in some cases wherein certain dopants are employed, e.g. magnesium as a dopant for an aluminum-silicon parent metal and where air is employed as oxidant, the formation of the oxidation reaction product may be preceded by the formation of a thin layer of spinel, e.g. magnesium aluminate spinel, which forms essentially all in an initiation layer.

At this temperature, or within this temperature range, molten metal is transported into and through the oxidation reaction product (as disclosed in the Commonly Owned Patent Applications), and towards the vapor-phase oxidant. Molten parent metal continues to react with the vapor-phase oxidant at the interface between the previously formed oxidation reaction product and the vapor-phase oxidant, thereby forming a progressively thicker layer of oxidation reaction product.

It has been discovered that one or more process conditions can be changed or altered during this progressive process such that the oxidation reaction product formed after or as a result of that altering differs in one or more properties from the oxidation reaction product formed prior to the altering. The property or properties may differ in composition, such as nitride versus oxide, or in measurable performance, such as hardness or fracture toughness, or in metallographic characteristics of the microstructure. One or more properties can be altered in accordance herewith one time, or a series of times. The resulting cohesive ceramic structure comprises at least two zones, each comprising the oxidation reaction product of the parent metal and a vapor-phase oxidant.

Altering of process conditions can be accomplished by any one of several means or combination of means. Altering can include (1) providing a second vapor-phase oxidant and replacing the original vapor-phase oxidant with the second vapor-phase oxidant, (2) providing one or more process modifiers and conjoining the parent metal with the process modifier to produce a refined microstructure, or (3) increasing or decreasing the reaction temperature, or combinations of (1), (2), or (3).

In accordance with one embodiment of the present invention, a source of a second vapor-phase oxidant is provided to accomplish the altering. The oxidation reaction between the molten parent metal and the original vapor-phase oxidant is continued for a time sufficient to develop a layer or zone comprising the oxidation reaction product of the parent metal and original vapor-phase oxidant and non-oxidized metallic constituents. The original vapor-phase oxidant is then replaced with the second vapor-phase oxidant, and the oxidation of the molten parent metal is continued by the second vapor-phase oxidant. This reaction is continued for a time sufficient to develop a zone of oxidation reaction product of the molten parent metal and second vapor-phase oxidant of desired thickness. The ceramic body is thus comprised of a cohesive combination of the respective oxidation reaction products. For example, an aluminum parent metal can be first reacted with air to form alumina. The process then can be altered to provide a nitrogen gas, and aluminum nitride is then formed. The process conditions can be reversed. The resulting ceramic body comprises a cohesive monolith.

In accordance with another embodiment of the present invention, the altering comprises the conjunction of a process modifier (as disclosed in Commonly Owned Patent Application "D") with the parent metal. In the case of employing an aluminum parent metal and air as oxidant, suitable modifiers include nickel, iron, cobalt, zirconium, titanium, niobium, copper and chromium. The modifier preferably is in powder or particulate form and dispersed over, or contacted with, one or more surfaces of the parent metal or the developing ceramic body. The unmodified oxidation reaction process is continued for a time sufficient to develop a layer or zone, comprising the oxidation reaction product of the unmodified reaction, of desired thickness. A suitable quantity of a process modifier is then conjoined with the parent metal, and the subsequent oxidation reaction process is modified producing a ceramic microstructure which is refined relative to that formed prior to the conjunction. This modified process is continued for a time sufficient to develop a zone of refined oxidation reaction product of desired thickness. The ceramic body is thus comprised of a cohesive combination of different microstructures.

It should be understood, in accordance with the present invention, that in some cases the particular altered process conditions resulting from the particular altering means chosen may degrade or degenerate the initial zone or one or more prior zones of oxidation reaction product. For example, certain oxidation conditions will substantially degrade certain oxidation reaction products. Therefore, care must be taken to ensure that oxidation reaction conditions effected will be compatible with the zone or zones of oxidation reaction product formed anterior to the particular altering. Additionally, since the oxidation reactions of the present invention are carried out at high temperatures, care should be taken in designing a particular system to account or provide for difference in thermal expansion coefficients between juxtaposed or adjacent zones of separate oxidation reaction products. The extreme difference in thermal expansion between zones may result in cracking of one zone. However, certain thermal expansion mismatches between adjacent zones can provide an inherent prestress on the ceramic body, as in placing an interior zone of oxidation reaction product into compression by forming a zone of oxidation reaction product around it which has a greater thermal expansion coefficient. Such prestresses can in certain end-use employment result in improved performance of an end product.

As explained in the Commonly Owned Patent Applications, dopant materials, used in conjunction with the parent metal, favorably influence the oxidation reaction process, particularly in systems employing aluminum as the parent metal. Therefore, in some cases a dopant material will need to be used in addition to the modifier. The dopant or dopants used in conjunction or in association with the parent metal (1) may be provided as alloying constituents of the parent metal, (2) may be applied to at least a portion of the surface of the parent metal, or (3) may be applied to or incorporated into part or all of the filler material or preform, or any combination of two or more of techniques (1), (2), or (3) may be employed. For example, an alloyed dopant may be used solely or in combination with a second externally applied dopant. In the case of technique (3), wherein additional dopant or dopants are applied to the filler material, the application may be accomplished in any suitable manner as explained in the Commonly Owned Patent Applications.

The function or functions of a particular dopant material can depend upon a number of factors. Such factors include, for example, the particular combination of dopants when two or more dopants are used, the use of an externally applied dopant in combination with a dopant alloyed with the precursor metal, the concentration of dopant employed, the oxidizing environment, process conditions, and as stated above, the identity and concentration of the modifier metal present.

Dopants useful for an aluminum parent metal, particularly with air as the oxidant, include magnesium, zinc, and silicon, either alone or in combination with other dopants, as described below. These metals, or a suitable source of the metals, may be alloyed into the aluminum-based parent metal at concentrations for each of between about 0.1–10% by weight based on the total weight of the resulting doped metal. These dopant materials or a suitable source thereof (e.g. MgO, ZnO, or $SiO_2$) may be used externally to the parent metal. Thus an alumina ceramic structure is achievable for an aluminum-silicon parent metal using air as the oxidant by using MgO as a dopant in an amount greater than about 0.0008 gram per gram of parent metal to be oxidized and greater than 0.003 gram per square centimeter of parent metal upon which the MgO is applied. However, the concentration of dopant needed, as discussed above, may depend upon the identity, presence, and concentration of a modifier metal.

Additional examples of dopant materials for aluminum parent metal include sodium, germanium, tin, lead, lithium, calcium, boron, phosphorus, and yttrium which may be used individually or in combination with one or more dopants depending on the oxidant, identity and quantity of modifier metal present and process conditions. Rare earth elements such as cerium, lanthanum, praseodymium, neodymium, and samarium are also useful dopants, and herein again especially when used in combination with other dopants. All of the dopant materials, as explained in the Commonly Owned Patent Applications, are effective in promoting polycrystalline oxidation reaction product growth for the aluminum-based parent metal systems.

EXAMPLE

A cohesive ceramic structure comprising a zone of alumina and a zone of aluminum nitride was fabricated in accordance with the present invention by altering the composition of the vapor-phase oxidant during formation of the ceramic structure.

A cylindrical ingot of aluminum alloy from Belmont Metals Inc. having the composition shown in Table A the measuring 1 inch in diameter and ½ inch tall, was placed into a bed of alumina particles, contained in a refractory crucible, such that one circular face of the ingot was exposed to the atmosphere and substantially flush with the bed. This setup was placed into an induction furnace with a controlled atmosphere. The ingot was heated in flowing oxygen (400 cc/min) to a surface temperature of 1000° C. (optical pyrometer measurement) over 1 hour. The oxidation in oxygen was carried out under the aforementioned conditions for 7 hours. The atmosphere supply was then switched to forming gas comprising 96% nitrogen and 4% hydrogen, and the oxidation was continued for 5 hours in forming gas. The resulting ceramic body was recovered and cross-sectioned to reveal a cohesive structure comprising adjacent zones. X-ray diffraction analysis of the separate zones confirmed alumina as the first zone and aluminum nitride as the posterior zone. FIG. 1 is a photomicrograph at 200X magnification showing the zone of alumina 2 and the zone of aluminum nitride 4 with no discontinuity in physical microstructure.

TABLE A

Aluminum Parent Metal Alloy Composition (Nominal)
3.7%: zinc
3.9%: copper
1.1%: iron
8.3%: silicon
0.19%: magnesium
0.04%: nickel
0.02%: tin
0.04%: chromium
0.20%: manganese
0.08%: titanium
Balance: aluminum

What is claimed is:

1. A method for producing a self-supporting ceramic body by oxidation of a parent metal, said ceramic body having a graded microstructure characterized by a plurality of zones differing from each other in at least one property, which method comprises the steps of:
   (a) heating said parent metal in the presence of a vapor-phase oxidant to a temperature range above the melting point of the parent metal but below the melting point of any resulting oxidation reaction product of the parent metal and the vapor-phase oxidant, to form a body of molten parent metal and reacting said molten parent metal with said vapor-phase oxidant at said temperature range to said oxidation reaction product, which product is in contact with and extends between said body of molten metal and said vapor-phase oxidant;
   (b) at said temperature, transporting said molten metal through said oxidation reaction product towards said vapor-phase oxidant so that fresh oxidation reaction product forms at an interface between said vapor-phase oxidant and previously formed oxidation reaction product thereby forming a progressively thicker first portion of said oxidation reaction product;
   (c) altering at least one process condition during formation of said first portion of said oxidation reaction product such that at least a second portion of oxidation reaction product formed posterior to said altering has at least one property different from said first portion of oxidation reaction product formed anterior to said altering:
   (d) continuing said reaction for a time sufficient to produce said first portion and said at least a second portion of said oxidation reaction product to form said ceramic body; and
   (e) recovering said ceramic body.

2. A method for producing a self-supporting ceramic composite body by oxidation of a parent metal, said ceramic composite body having a graded microstructure characterized by a plurality of zones differing from each other in at least one property, which method comprises the steps of:
   (a) orienting a filler adjacent to said parent metal;
   (b) heating said parent metal in the presence of a vapor-phase oxidant to a temperature range above the melting point of the parent metal but below the melting point of any resulting oxidation reaction product of the parent metal and the vapor-phase oxidant, to form a body of molten parent metal and reacting said molten parent metal with said vapor-phase oxidant at said temperature range to form said oxidation reaction product, which product is in contact with and extends between said body of molten metal and said vapor-phase oxidant;
   (c) at said temperature, transporting said molten metal through said oxidation reaction product towards said vapor-phase oxidant so that fresh oxidation reaction product forms at an interface between said vapor-phase oxidant and previously formed oxidation reaction product thereby forming a progressively thicker first portion of said oxidation reaction product;

(d) altering at least one process condition during formation of said first portion of said oxidation reaction product such that at least a second portion of oxidation reaction product formed posterior to said altering has at least one property different from said first portion of oxidation reaction product formed anterior to said altering;

(e) continuing said reaction for a time sufficient so that said first portion and said at least a second portion of said oxidation reaction product infiltrates said filler to thereby form said ceramic composite body; and (f) recovering said ceramic composite body.

3. The method of claim 1 or claim 2, wherein said altering comprises replacing said vapor-phase oxidant with a second vapor-phase oxidant and reacting said parent metal with said second vapor-phase oxidant to form said at least a second portion of oxidation reaction product.

4. The method of claim 1 or claim 2, wherein said altering comprises conjoining said parent metal with at least one process modifier and continuing said oxidation reaction to form a zone comprising said at least a second portion of oxidation reaction product of said parent metal and said vapor-phase oxidant, said at least a second portion of oxidation reaction product having a microstructure which is refined compared with said first portion of oxidation reaction product.

5. The method of claim 1 or claim 2, wherein said parent metal comprises a metal selected from the group consisting of: aluminum, titanium, zirconium, hafnium, silicon, and tin.

6. The method of claims 1 or claim 2, wherein said vapor-phase oxidant comprises an oxidant selected from the group consisting of: forming gas and gas mixtures containing oxygen.

7. The method of claim 1 or claim 2, wherein said altering comprises changing said temperatures to a second temperature above the melting point of said parent metal and below the melting point of said at least a second portion of oxidation reaction product and continuing said oxidation reaction at said changed temperature to form a zone comprising said at least a second portion of oxidation reaction product formed at the changed temperature.

8. The method of claim 1 or claim 2, wherein said altering comprises at least two of the three steps (a), (b) and (c) defined below to form a zone having accumulation of the properties defined in the steps employed, the steps comprising:

(a) providing a source of a second vapor-phase oxidant and replacing said vapor-phase oxidant with said second vapor-phase oxidant and reacting said parent metal with said second vapor-phase oxidant to form said zone comprising said at least a second portion of oxidation reaction product of said parent metal and said second vapor-phase oxidant;

(b) providing a source of a process modifier and conjoining said parent metal with said modifier and continuing said oxidation reaction to form a zone comprising said at least a second portion of oxidation reaction product of said parent metal and said vapor-phase oxidant having a microstructure which is refined compared with said first portion of oxidation reaction product; and (c) changing said temperature to a second temperature above the melting point of said parent metal and below the melting point of said at least a second portion of oxidation reaction product and continuing said reaction at said changed temperature to form a zone comprising said at least a second portion of oxidation reaction product formed at the changed temperature.

9. The method of claim 1 or claim 2, further comprising conducting said altering of the process conditions at least two times to produce said plurality of zones.

10. The method of claim 3, wherein said parent metal comprises a metal selected from the group consisting of: aluminum, titanium, zirconium, hafnium, silicon, and tin.

11. The method of claim 4, wherein said parent metal comprises a metal selected from the group consisting of: aluminum, titanium, zirconium, hafnium, silicon, and tin.

12. The method of claim 3, wherein said vapor-phase oxidant comprises a oxidant selected from the group consisting of: forming gas and gas mixtures containing oxygen.

13. The method of claim 4, wherein said vapor-phase oxidant comprises an oxidant selected from the group consisting of: forming gas and gas mixtures containing oxygen.

14. The method of claim 5, wherein said vapor-phase oxidant comprises an oxidant selected from the group consisting of: forming gas and gas mixtures containing oxygen.

* * * * *

UNITED STATES PATENT AND TRADEMARK OFFICE
CERTIFICATE OF CORRECTION

Page 1 of 2

PATENT NO. : 4,882,306

DATED : November 21, 1989

INVENTOR(S) : Christopher R. Kennedy et al.

It is certified that error appears in the above-identified patent and that said Letters Patent is hereby corrected as shown below:

On the cover page under item [22]: change "1988" to --1986--
On the cover page under item [56]: the subclasses are missing from the Patent as follows:

| | |
|---|---|
| Udy | 25/157 |
| Talsma | 106/65 |
| Hare | 106/40 |
| Seufert | 106/65 |
| Mao | 106/65 |
| Bawa | 29/182.5 |
| Seufert | 51/298 |
| Oberlin | 106/57 |
| Sowards | 156/89 |
| Newkirk et al. | 373/117 |
| Pepper et al. | 117/47 R |
| Church | 264/60 |
| Gazza et al. | 29/123 |
| Wilson | 501/120 |

Column 1, line 19: change "fo" to --for--.
Column 1, line 56: change ""composite" to --"Composite--.
Column 3, line 13: change "and" (second occurrence) to --the--.
Column 3, line 45: change "methiod" to --method--.
Column 7, line 37: change "the" to --and--.
Column 8, line 18: after "to" insert --form--.
Column 8, line 36: after "altering" change ":" to --;--.

UNITED STATES PATENT AND TRADEMARK OFFICE
CERTIFICATE OF CORRECTION

PATENT NO. : 4,882,306

DATED : November 21, 1989

INVENTOR(S) : Christopher R. Kennedy et al

It is certified that error appears in the above-identified patent and that said Letters Patent is hereby corrected as shown below:

```
Column 9, line 39:    change "temperatures" to --temperature.
Column 10, line 38:   change "a" to --an--.
```

Signed and Sealed this

Sixth Day of April, 1993

Attest:

STEPHEN G. KUNIN

*Attesting Officer*     Acting Commissioner of Patents and Trademarks